(12) United States Patent
Kitahara

(10) Patent No.: US 9,109,930 B2
(45) Date of Patent: Aug. 18, 2015

(54) FLOW DETECTION DEVICE

(71) Applicant: DENSO CORPORATION, Kariya, Aichi-pref. (JP)

(72) Inventor: Noboru Kitahara, Kariya (JP)

(73) Assignee: DENSO CORPORATION, Kariya (JP)

( * ) Notice: Subject to any disclaimer, the term of this patent is extended or adjusted under 35 U.S.C. 154(b) by 99 days.

(21) Appl. No.: 13/958,688

(22) Filed: Aug. 5, 2013

(65) Prior Publication Data

US 2014/0083179 A1    Mar. 27, 2014

(30) Foreign Application Priority Data

Sep. 25, 2012    (JP) .................................. 2012-211595

(51) Int. Cl.
*G01F 5/00* (2006.01)
*G01F 1/692* (2006.01)

(52) U.S. Cl.
CPC . *G01F 5/00* (2013.01); *G01F 1/692* (2013.01)

(58) Field of Classification Search
CPC ......... G01F 5/00; G01F 1/6842; G01F 5/005; G01F 1/6847; G01F 1/00
USPC ........ 73/202, 202.5, 861, 152.29, 54.07, 155, 73/181
See application file for complete search history.

(56) References Cited

U.S. PATENT DOCUMENTS

| | | | |
|---|---|---|---|
| 8,205,493 B2* | 6/2012 | Mais et al. .................... | 73/202.5 |
| 2004/0129073 A1* | 7/2004 | Saito et al. ................. | 73/204.22 |
| 2006/0137438 A1* | 6/2006 | Lenzing et al. .............. | 73/118.2 |
| 2009/0173151 A1* | 7/2009 | Morino et al. ............... | 73/202.5 |
| 2012/0103084 A1* | 5/2012 | Ooga et al. ................. | 73/204.25 |
| 2012/0103086 A1* | 5/2012 | Goka et al. ................. | 73/204.26 |

FOREIGN PATENT DOCUMENTS

JP    2006-258675 A    9/2006

OTHER PUBLICATIONS

Notice of Rejection dated Oct. 21, 2014 in corresponding JP Application No. 2012-211595 (with English translation).

* cited by examiner

*Primary Examiner* — Lisa Caputo
*Assistant Examiner* — Nigel Plumb

(57) ABSTRACT

A plate-like flow sensor is located in a bypass passage such that a front-to-rear direction of the flow sensor is substantially along a width direction of the bypass passage. The flow sensor divides a flow from its upstream into a first flow, which passes on its front side, and a second flow, which passes on its rear side. The bypass passage has a bent portion in which the first flow and the second flow merge on a downstream side of the flow sensor. A flow deflection unit changes a turning quantity of at least one of the first flow and the second flow such that a turning quantity of the first flow and a turning quantity of the second flow are substantially conformed in the bent portion.

5 Claims, 6 Drawing Sheets

FLOW DETECTION DEVICE

CROSS REFERENCE TO RELATED APPLICATION

This application is based on reference Japanese Patent Application No. 2012-211595 filed on Sep. 25, 2012, the disclosure of which is incorporated herein by reference.

TECHNICAL FIELD

The present disclosure relates to a flow detection device including a housing, which forms a bypass passage configured to receive a part of airflow passing through a duct, and a flow sensor, which is located in the bypass passage and configured to detect the airflow.

BACKGROUND

As shown in FIG. 9, a conventional flow detection device 100, which is disclosed in a patent document 1, includes a housing 102 and a flow sensor 103. The housing 102 forms a bypass passage 101, which receives a part of an airflow passing through a duct. The flow sensor 103 is arranged in the bypass passage 101 to detect an airflow passing through the bypass passage 101.

As shown in FIG. 10, the flow sensor 103 is in a plate shape. The flow sensor 103 is arranged so that a front-to-rear direction of the flow sensor 103 is substantially along a passage-width direction of the bypass passage 101. That is, the direction from the front side of the flow sensor 103 to the rear side of the flow sensor 103 is substantially along the width direction of the bypass passage 101. In the present configuration, when airflow passes through the bypass passage 101 and reaches the flow sensor 103, the airflow is divided into a first flow F1, which passes on the front side of the flow sensor 103, and a second flow F2, which passes on the rear side of the flow sensor 103. Thereafter, the first flow F1 and the second flow F2 merge on the downstream side relative to the flow sensor 103. In the bypass passage 101, a bent portion 101a is equipped on the downstream side relative to the flow sensor 103 to bend the airflow therein. The first flow F1 and the second flow F2 merge in the bent portion 101 while turning its direction.

(Patent Document 1) Publication of International Patent Application No. 2006-501453

In such a configuration, the first flow F1 and the second flow F2 may not merge with each other smoothly on the downstream relative to the flow sensor 103. In such a case, an output of the flow sensor 103 may become unstable, and accuracy of flow detection may become insufficient.

It is noted that, the patent document 1 may disclose a step formed on the wall surface of a bypass passage to generate a swirl flow. Nevertheless, the object of the step in the patent document 1 is not to smoothen an airflow on the front side of the flow sensor and an airflow on the rear side of the flow sensor.

SUMMARY

It is an object of the present disclosure to produce a flow detection device configured to merge a flow on the front side of a flow sensor and a flow on the rear side of the flow sensor smoothly.

According to an aspect of the present disclosure, a flow detection device comprises a housing forming a bypass passage configured to receive a part of air flowing through a duct. The flow detection device further comprises a flow sensor located in the bypass passage. The flow sensor is substantially in a plate shape and located such that a front-to-rear direction of the flow sensor is substantially along a passage-width direction of the bypass passage. The flow sensor is configured to divide a flow from an upstream side into a first flow, which passes on a front side of the flow sensor, and a second flow, which passes on a rear side of the flow sensor. The bypass passage has a bent portion on a downstream side of the flow sensor, the bent portion defining a bent passage configured to merge the first flow and the second flow therein. The flow detection device further comprises a flow deflection unit configured to change a turning quantity of at least one of the first flow and the second flow, such that a turning quantity of the first flow in the bent portion and a turning quantity of the second flow in the bent portion substantially conform to each other.

According to another aspect of the present disclosure, a housing forming a bypass passage configured to receive a part of air flowing through a duct. The flow detection device further comprises a flow sensor located in the bypass passage. The flow sensor is substantially in a plate shape and located such that a front-to-rear direction of the flow sensor is substantially along a passage-width direction of the bypass passage. The flow sensor is configured to divide a flow from an upstream side into a first flow, which passes on a front side of the flow sensor, and a second flow, which passes on a rear side of the flow sensor. The bypass passage has a bent portion on a downstream side of the flow sensor, the bent portion defining a bent passage configured to merge the first flow and the second flow therein. The housing has a wall surface defining the bypass passage, the wall surface including an inner wall surface, which is located on a radially inner side of the bent portion, and an outer wall surface, which is located on a radially outer side of the bent portion. At least one of the inner wall surface and the outer wall surface has at least one of a projection and a step.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
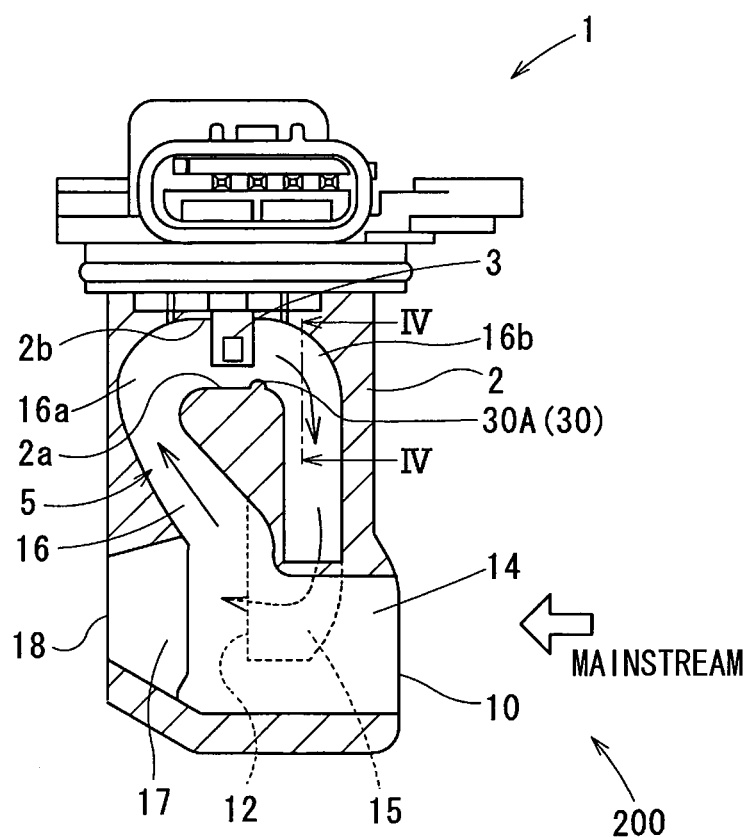
FIG. 1 is a sectional view showing an airflow detection device according to a first embodiment.

As follows, embodiments of the present disclosure will be described in detail.

First Embodiment

Configuration of First Embodiment

The configuration of an airflow detection device 1 of the first embodiment will be described with reference to FIGS. 1-5. The airflow detection device 1 is, for example, an air flow meter for detecting an intake air quantity to a vehicular engine. The airflow detection device 1 is, for example, equipped to a duct 200, which forms an air intake passage extending to the vehicular engine.

The airflow detection device 1 is configured with a housing 2, a flow sensor 3, a circuit module, and/or the like, which are integrated with each other.

The housing 2 is formed of a resin material to form a bypass passage 5, which receives a part of air flowing through the duct 200. The bypass passage 5 opens toward an upstream side of airflow (mainstream), which passes through the air intake passage. The bypass passage 5 includes an intake port 10, an internal passage, and exhaust ports 12. The intake port 10 receives a part of intake air. The internal passage passes air, which flows from the intake port 10, therethrough. The exhaust ports 12 open into the air intake passage. The exhaust ports 12 are directed toward a downstream side of airflow to return air received from the intake port 10 into the air intake passage.

The internal passage includes an intake passage 14, an exhaust passage 15, and a round passage 16. The intake passage 14 extends from the intake port 10 toward the downstream side. The exhaust passage 15 extends from the exhaust ports 12 toward the upstream side. The round passage 16 accommodates the flow sensor 3 and extends around to connect the intake passage 14 with the exhaust passage 15.

The intake passage 14 linearly extends from the intake port 10 toward the downstream side. Airflow passes through the intake passage 14 in parallel with a forward flow in the mainstream. The intake passage 14 has a downstream end connected with a dust discharge passage 17. The dust discharge passage 17 is for flowing dust, which is included in air received from the intake port 10, straight therethrough and for exhausting the dust. The dust discharge passage 17 has a downstream end, which forms a dust exhaust port 18.

Figure 2:
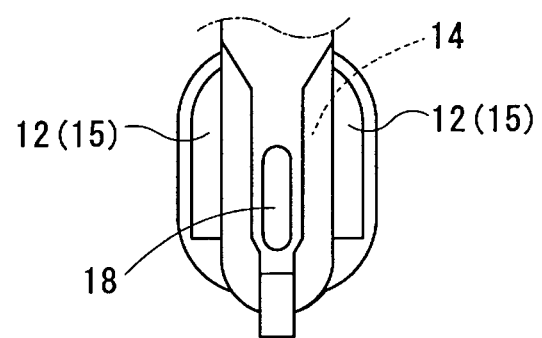
FIG. 2 is a view showing the airflow detection device when being viewed from its downstream side according to the first embodiment.

The round passage 16 is, for example, substantially in a C-shape. The round passage 16 connects with both the intake passage 14 and the exhaust passage 15. The round passage 16 receives air from the intake port 10 and passes the air from the intake passage 14 toward the exhaust passage 15 to move around therethrough. The exhaust passage 15 is connected to the downstream end of the round passage 16. The exhaust passage 15 is bent substantially at a right angle from the downstream end of the round passage 16. The exhaust ports 12 are formed at the downstream end of the round passage 16. The exhaust passage 15 branches from its upstream end into two passages to straddle around the intake passage 14. As shown in FIG. 2, two exhaust ports 12 are formed at two locations on both sides of the intake passage 14. FIG. 1 is a sectional view, and therefore, one of the two exhaust ports 12 is shown by a hidden line.

As shown in FIG. 1 air flows into an inlet of the round passage 16, which is a branch from the dust exhaust passage, and moves through the round passage 16 upward in the drawing. The air further flows through a first bent portion 16a and moves in an opposite direction from airflow in the intake passage 14. The air further flows through a second bent portion 16b and moves downward in the drawing toward the exhaust passage 15.

The flow sensor 3 is accommodated in a passage between the first bent portion 16a and the second bent portions 16b. That is, the flow sensor 3 is accommodated in a portion of the round passage 16 in which air flows in an opposite direction from the flow direction in the intake passage 14. That is, in the present embodiment, the bypass passage 5 includes the first bent portion 16a and the second bent portion 16b, in each of which the flow direction of air is bent, at the upstream and the downstream of the flow sensor 3.

Figure 3:
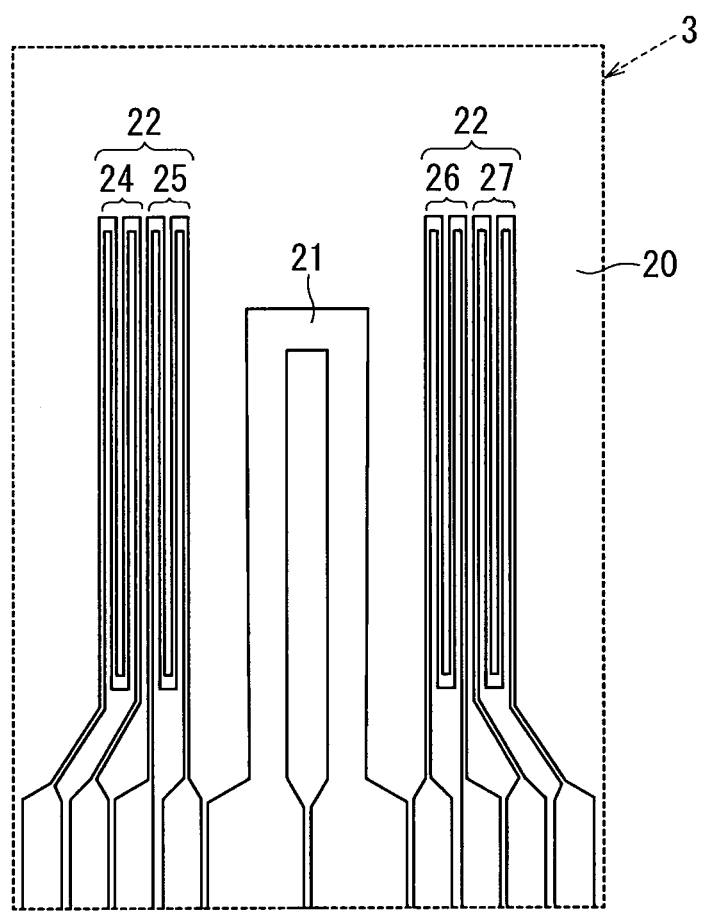
FIG. 3 is a view showing a main portion of a flow sensor of the airflow detection device according to the first embodiment.

The flow sensor 3 is configured to send an electric signal, such as a voltage signal, according to a quantity of air flowing through the round passage 16. Specifically, as shown in FIG. 3, the flow sensor 3 is substantially in a plate shape. The flow sensor 3 includes a semiconductor board equipped with a membrane 20 on its surface. The membrane 20 is equipped with a heater element 21 and a thermo-sensitive device 22 at its surface. Each of the heater element 21 and the thermo-sensitive device 22 is configured with a thin film resistor.

Figure 4:
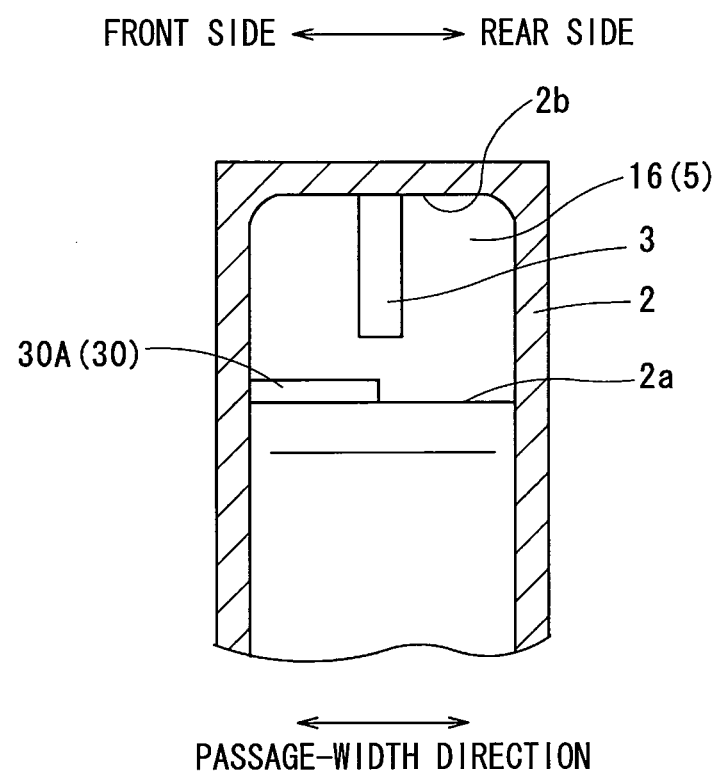
FIG. 4 is a sectional view taken along the line IV-IV in FIG. 1 and showing a bypass passage around the flow sensor when being viewed from the downstream side of the bypass passage, according to the first embodiment.

The elements 21 and 22 are equipped on a front side of the flow sensor 3. The flow sensor 3 has a rear side on the opposite side from the front side. The flow sensor 3 is arranged so that its rear and front direction is along a passage-width direction of the bypass passage 5. That is, as shown in FIG. 4, a space is formed on each of the front side and the rear side of the flow sensor 3 to pass air therethrough. In the present configuration, when air flows through the bypass passage 5 and reaches the flow sensor 3, the airflow is divided into a first flow F1, which flows on the front side of the flow sensor 3, and a second flow F2, which flows on the rear side of the flow sensor 3. Thereafter, the second flow F2 and the first flow F1 merge at the second bent portion 16b on the downstream side from the flow sensor 3.

The thermo-sensitive device 22 includes two resistance temperature sensors 24 and 25, which are equipped on the upstream side of the heater element 21, and two resistance temperature sensors 26 and 27, which are equipped on the downstream side of the heater element 21. The heater element 21 and the thermo-sensitive device 22 are electrically connected to a circuit board, which is accommodated in a circuit module. The heater element 21 and the thermo-sensitive device 22 are configured to generate an electrical signal according to a difference between a temperature of with the resistance temperature sensors 24 and 25 and a temperature of the resistance temperature sensors 26 and 27. The heater element 21 and the thermo-sensitive device 22 are further configured to send the electrical signal via an output circuit and an amplifying circuit, which are equipped to the circuit board.

The circuit module includes a heating element control circuit, the output circuit, and the amplifier circuit. The heating element control circuit controls the temperature of the heater element 21 at a preset temperature. The output circuit sends the voltage signal according to a flow quantity of air. The amplifier circuit amplifies an output voltage of this output circuit. The amplifier circuit includes a rewritable memory configured to store a gain and an offset.

Feature of First Embodiment

The flow detection device 1 according to the present embodiment includes a flow deflection unit 30. The flow deflection unit 30 is configured to change a turning quantity of at least one of the first flow F1 and the second flow F2 such that the turning quantity of the first flow F1 in the second bent portion 16b and the turning quantity of the second flow F2 in the second bent portion 16b substantially conform to each other. The housing 2 has a wall surface defining the bypass passage 5. The wall surface of the housing 2 defining the bypass passage 5 includes an inner wall surface 2a and an outer wall surface 2b. The inner wall surface 2a is located inside the turning of the second bent portion 16b. The outer wall surface 2b is located outside the turning of the second bent portion 16b. The flow deflection unit 30 is a projection 30A equipped to at least one of the wall surface 2a and the outer wall surface 2b.

Figure 9:
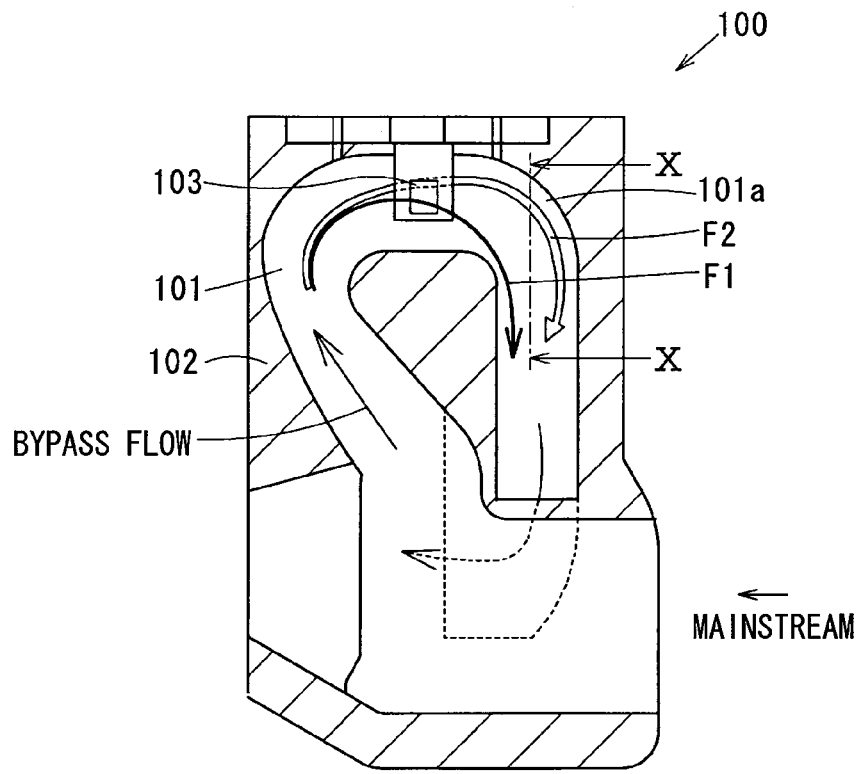
FIG. 9 is a sectional view showing an airflow detection device according to a prior art.

For example, a configuration is assumable, as shown in FIG. 9, that the flow deflection unit 30 is not equipped, and the first flow F1 tends to flow radially inside the second bent portion 16b. In the present embodiment, without the flow deflection unit 30, the first flow F1 tends to flow radially inside the second bent portion 16b. On such a premise, in the present embodiment, the flow deflection unit 30 is equipped to change the direction of the first flow F1 to pass further radially outside. Specifically, as the flow deflection unit 30, a projection 30A is equipped to the inner wall surface 2a to be projected outward from the inner wall surface 2a, such that the first flow F1 is slightly removed from the inner wall surface 2a.

As shown in FIG. 4, the projection 30A is formed on a portion of the inner wall surface 2a, which is located on the front side of the flow sensor 3, to work selectively to the first flow F1. In addition, the projection 30A is equipped on the downstream side relative to the center of the flow sensor 3 in the flow direction.

Effect of First Embodiment

Figure 5:
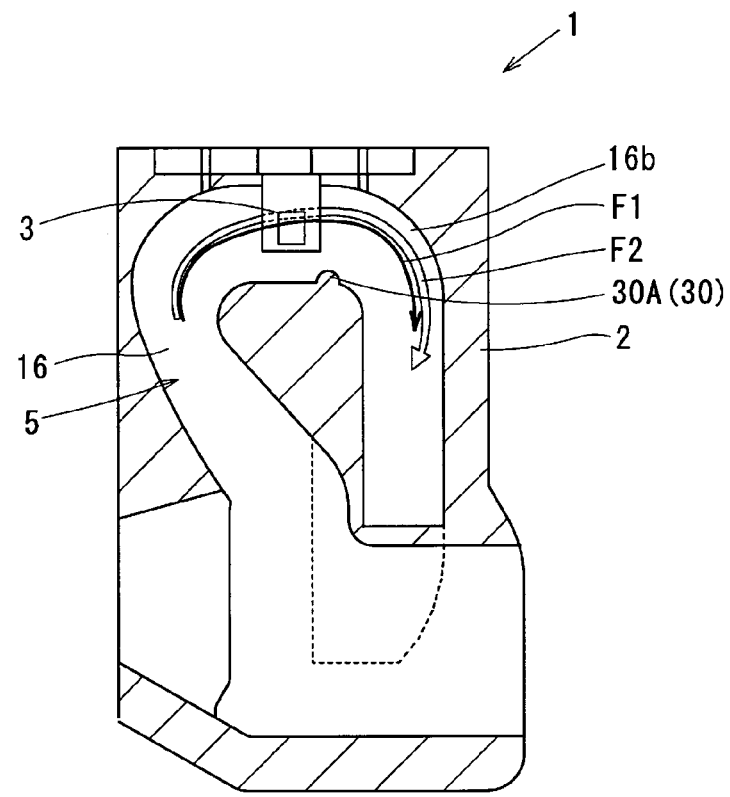
FIG. 5 is a view showing an effect produced by the configuration of the airflow detection device according to the first embodiment.

In the airflow detection device 1 of the present embodiment, the projection 30A causes the first flow F1 to be removed slightly from the inner wall surface 2a. Therefore, the first flow F1 turns on the further outside in the configuration of the present embodiment, compared with the configuration shown in FIG. 9 without the projection 30A. Consequently, as shown in FIG. 5, the turning quantity of the first flow F1 is caused substantially to conform to the turning quantity of the second flow F2.

Thus, the turning quantity of the first flow F1 and the turning quantity of the second flow F2 can be substantially conformed to each other on the downstream side of the flow sensor 3. As a result, the first flow F1 and second flow F2 can be merged further smoothly to stabilize the sensor output of the flow sensor 3. In addition, the projection 30A is equipped as the flow deflection unit 30 on the downstream side in the flow direction relative to the center of the flow sensor 3. In the present configuration, the first flow F1 and the second flow F2 can be merged together further smoothly, compared with a configuration in which the projection 30A is equipped on the upstream side in the flow direction relative to the center of the flow sensor 3.

Second Embodiment

Configuration of Second Embodiment

Figure 6:
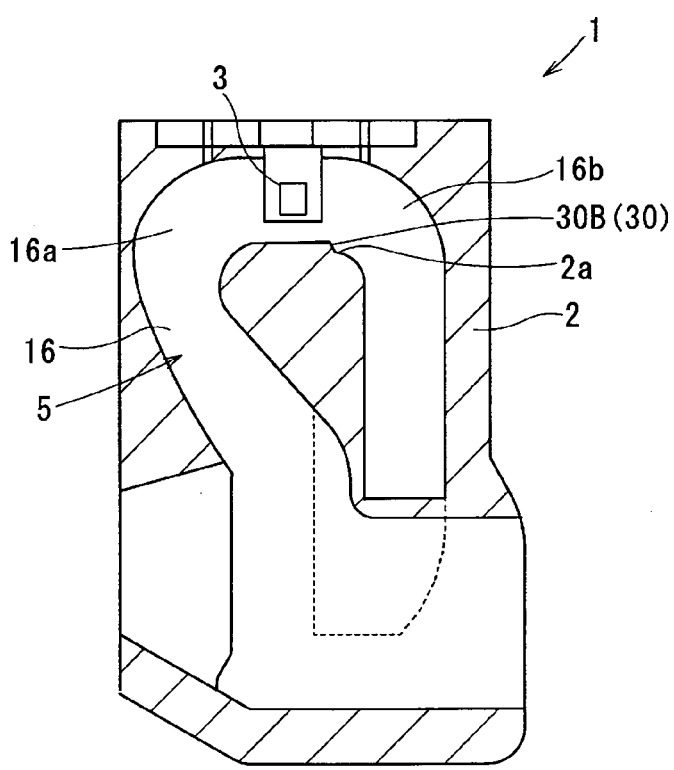
FIG. 6 is a sectional view showing an airflow detection device according to a second embodiment.

As follows, the second embodiment of the present disclosure will be described with reference to FIG. 6. In the following description, difference of the second embodiment from the first embodiment will be mainly described. In the present embodiment, a step 30B is equipped as the flow deflection unit 30. The step 30B is formed in the inner wall surface 2a to be projected outward by one step. The step 30B is configured to function similarly to the projection 30A. The configuration according to the present embodiment produces a similar operation effect to that of the first embodiment.

Modification

In the above embodiment, the flow deflection unit 30 is equipped selectively to the side of the first flow F1, on assumption of the configuration in which the first flow F1 tends to pass on the radially inside in the second bent portion 16b without the flow deflection unit 30. It is noted that, the configuration of the flow deflection unit 30, such as the position, the volume, and/or the like, can be arbitrarily determined according to the turning quantity of the first flow F1 and the turning quantity of the second flow F2 without the flow deflection unit 30.

For example, in a case where it is desired to change both the turning quantity of the first flow F1 and the turning quantity of the second flow F2, the flow deflection unit 30 may be equipped to both of the front side of the flow sensor 3 and the rear side of the flow sensor 3 on the inner wall surface 2a. The flow deflection unit 30 may be equipped not to the inner wall surface 2a but to the outer wall surface 2b. The flow deflection unit 30 may be equipped to both the inner wall surface 2a and the outer wall surface 2b.

In the above embodiments, the flow deflection unit 30 is equipped on the downstream side relative to the flow sensor 3. The configuration is not limited to those in the above-described embodiments. The flow deflection unit 30 may be equipped on the upstream side relative to the flow sensor 3.

Figure 7:
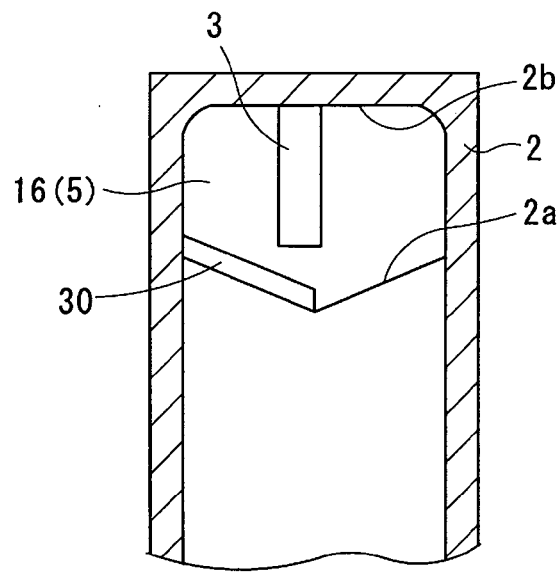
FIG. 7 is a view showing a bypass passage around the flow sensor, according to a first modification, when being viewed from the same direction as FIG. 4.
Figure 8:
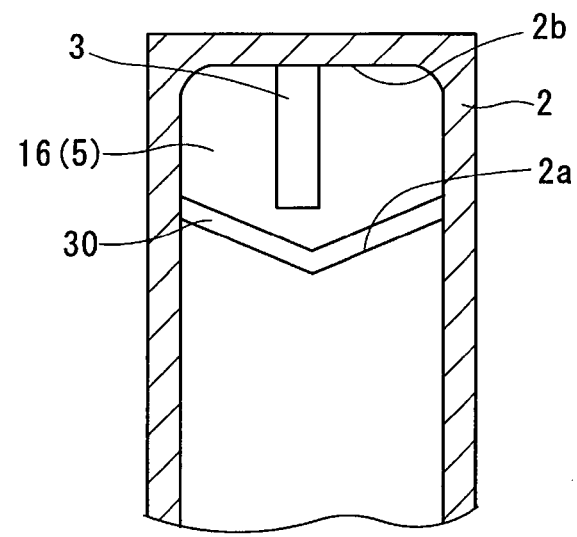
FIG. 8 is a view showing a bypass passage around the flow sensor, according to a second modification, when being viewed from the same direction as FIG. 4.

As shown in FIGS. 7 and 8 (first and second modification), the wall surface of the inner wall surface 2a may have a tapered surface, which is inclined outward from its center toward its outside in the passage-width direction. In this configuration, the bypass passage 5 has a cross section in a pentagonal shape. FIG. 8 shows the second modification in which the flow deflection unit 30 is equipped to the inner wall surface 2a on both the front side of the flow sensor 3 and the rear side of the flow sensor 3.

In the above embodiments, the flow deflection unit 30 is the projection 30A or the step 30B. The configuration of the flow deflection unit 30 is not limited to those in the above-described embodiments. For example, at least one of the inner wall surface 2a and the outer wall surface 2b may be equipped with, as the flow deflection unit 30, an unevenness portion, which includes a depression and a projection, and/or a dimple. For example, the bypass passage 5 may be equipped with, as the flow deflection unit 30, a deflection plate.

Figure 10:
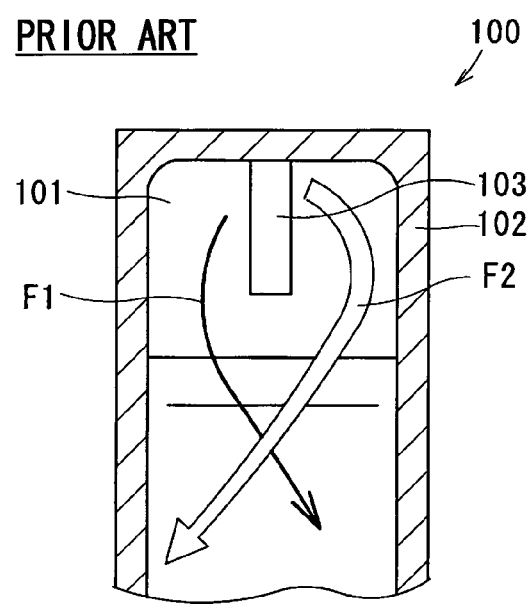
FIG. 10 is a sectional view taken along the line X-X in FIG. 9 and showing a bypass passage around a flow sensor when being viewed from the downstream side of the bypass passage, according to the prior art.

The inventor investigated, in a case where the turning quantity of the first flow F1 and the turning quantity of the second flow F2 do not conform to each other in the configuration of FIG. 9 and FIG. 10, that the first flow F1 and the second flow F2 do not merge with each other smoothly, as described above. Consequently, in such a configuration, the sensor output of the flow sensor 103 may not be stable. More specifically, the inventor found out that the second flow F2 may flow inside the first flow F1 in a specific case in dependence upon, for example, the shape of the passage, the position of the flow sensor 103 in the width direction, and/or the like. The inventor found in such a case that the output of the flow sensor 103 may not be stable.

In consideration of these subjects, the flow detection device of the present disclosure includes the housing and the flow sensor. The housing forms the bypass passage, which receives a part of air flowing through the duct. The flow sensor is arranged in the bypass passage. The flow sensor presents is in a plate shape. The flow sensor is arranged such that a front-to-rear direction of the flow sensor is along the passage-width direction of the bypass passage. That is, the direction from the front side of the flow sensor to the rear side of the flow sensor is substantially along the passage-width direction of the bypass passage. That is, the front side of the flow sensor and the rear side of the flow sensor are substantially perpendicular to the passage-width direction of the bypass passage. In the present configuration, the flow sensor divides the flow from the upstream side into the first flow, which flows on the front side of the flow sensor, and the second flow, which flows on the rear side of the flow sensor. The bypass passage has the bent portion, at which the passage is bent, on the downstream side of the flow sensor. The first flow and the second flow merge to each other at the bent portion.

The flow detection device includes the flow deflection unit, which is configured to change the turning quantity of at least one of the first flow and the second flow, such that the turning quantity of the first flow in the bent portion and the turning quantity of the second flow in the bent portion substantially conform to each other.

In the present configuration, the turning quantity of the first flow in the bent portion and the turning quantity of the second flow in the bent portion substantially conform to each other. Therefore, the first flow and the second flow can be merged smoothly.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A flow detection device comprising:
   a housing forming a bypass passage configured to receive a part of air flowing through a duct; and
   a flow sensor located in the bypass passage, wherein
   the flow sensor is substantially in a plate shape and located such that a front-to-rear direction of the flow sensor is substantially along a passage-width direction of the bypass passage, the flow sensor being configured to divide a flow from an upstream side into a first flow, which passes on a front side of the flow sensor, and a second flow, which passes on a rear side of the flow sensor,
   the bypass passage has a bent portion on a downstream side of the flow sensor, the bent portion defining a bent passage configured to merge the first flow and the second flow therein,
   the flow detection device further comprising:
   a flow deflection unit that defines, together with the housing and the flow sensor, a first flow path carrying the first flow and a second flow path carrying the second flow, the second flow path having a different cross-sectional area than the first flow path.

2. The flow detection device of claim 1, wherein:
   the housing has a wall surface defining the bypass passage, the wall surface including an inner wall surface, which is located on a radially inner side of the bent portion, and an outer wall surface, which is located on a radially outer side of the bent portion, and
   the flow deflection unit is one of a projection and a step formed on at least one of the inner wall surface and the outer wall surface.

3. The flow detection device according to claim 2, wherein the at least one of the projection and the step is located on a downstream side in a flow direction relative to a center of the flow sensor.

4. The flow detection device according to claim 2, wherein at least one of the inner wall surface and the outer wall surface has one of the projection and the step.

5. The flow detection device according to claim 2, wherein one of the inner wall surface and the outer wall surface has at least one of the projection and the step.

* * * * *